Nov. 8, 1938.  C. R. FAIREY  2,135,887
BLADE FOR AIRSCREWS AND THE LIKE
Filed June 3, 1936  4 Sheets-Sheet 2
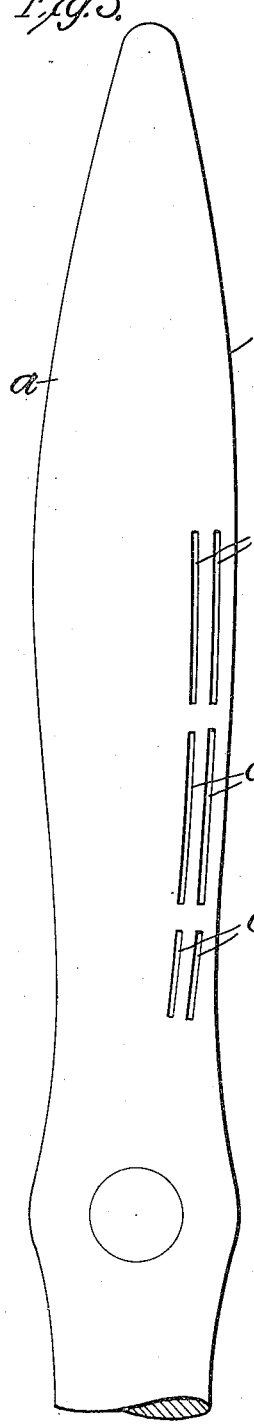
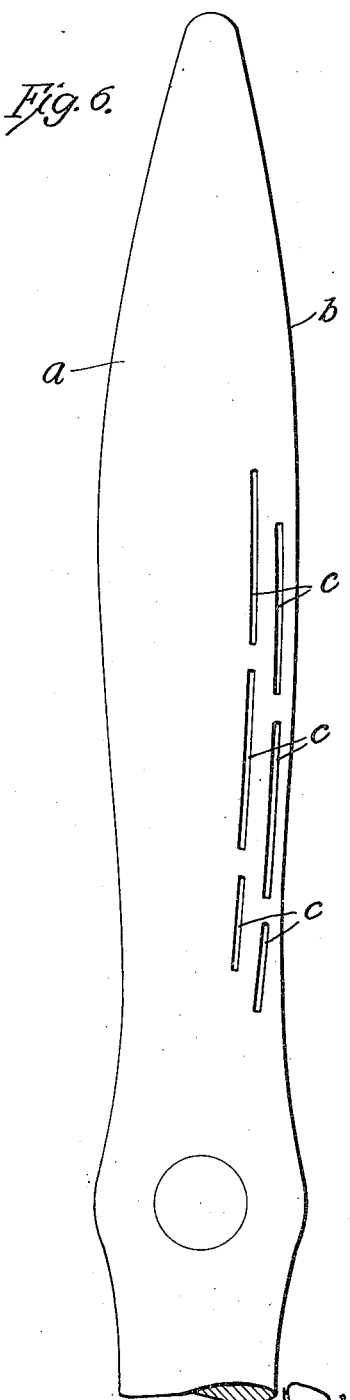
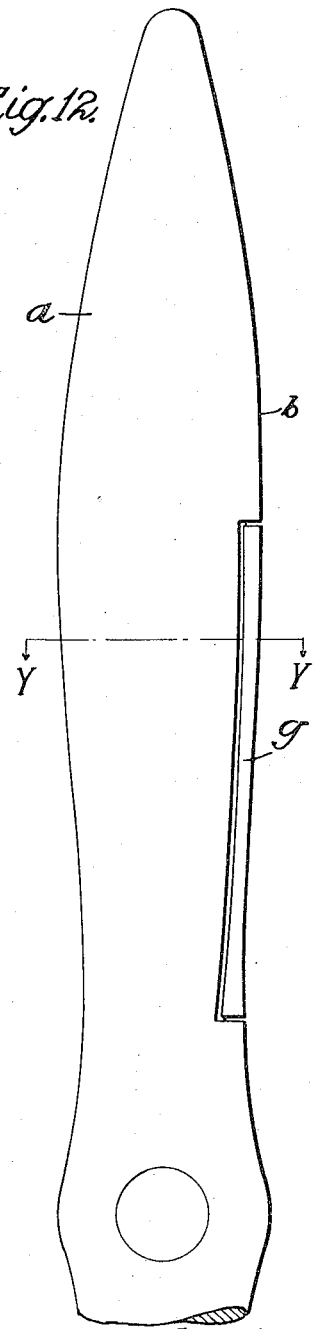

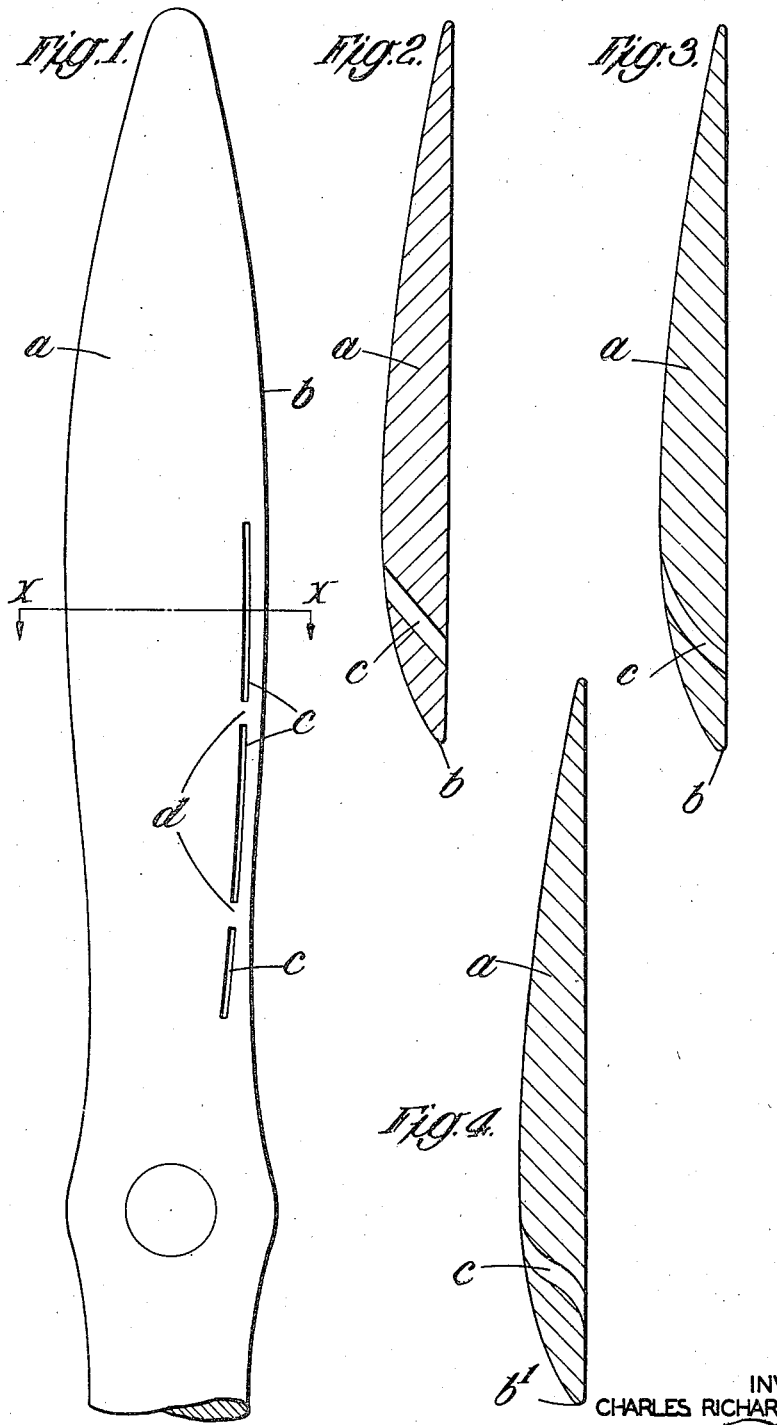

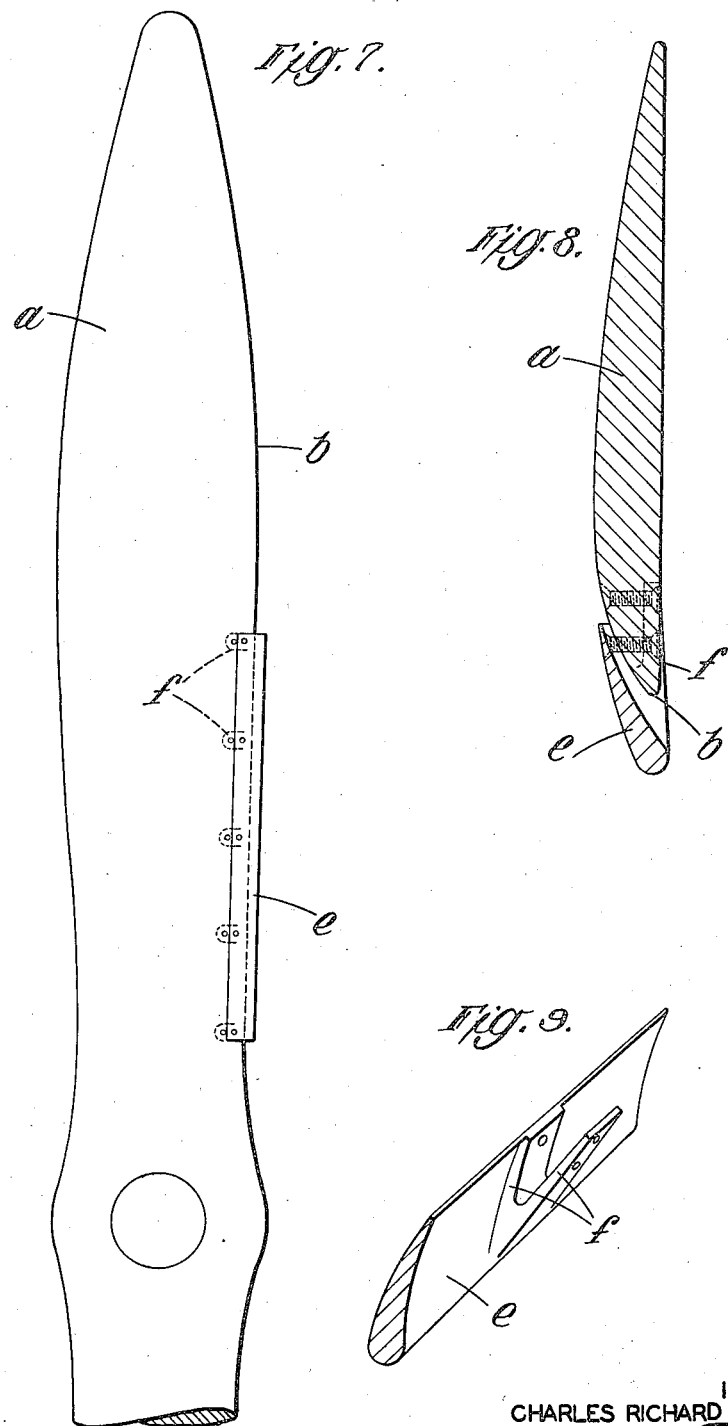

Nov. 8, 1938.  C. R. FAIREY  2,135,887
BLADE FOR AIRSCREWS AND THE LIKE
Filed June 3, 1936  4 Sheets-Sheet 4
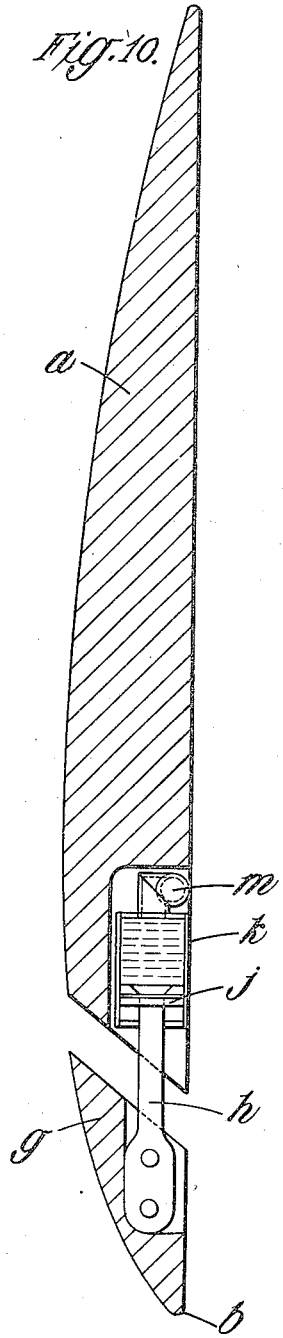
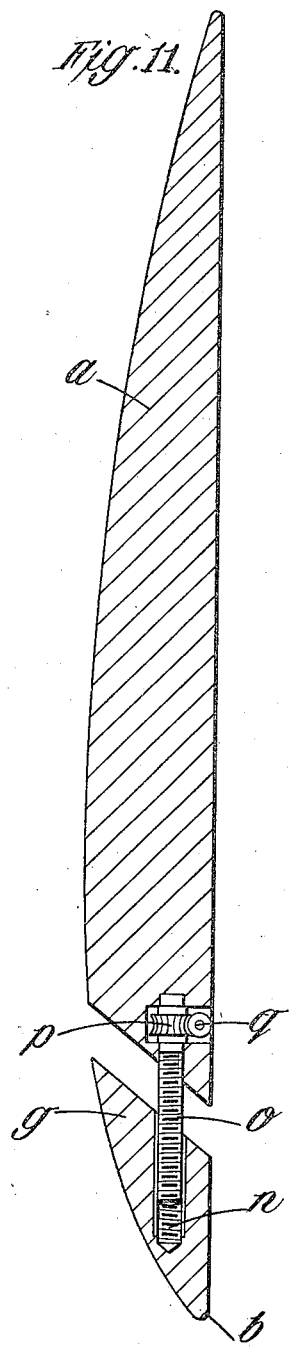
INVENTOR
CHARLES RICHARD FAIREY
ATTORNEYS Patented Nov. 8, 1938

2,135,887

UNITED STATES PATENT OFFICE 2,135,887

BLADE FOR AIRSCREWS AND THE LIKE

Charles Richard Fairey, Hayes, England

Application June 3, 1936, Serial No. 83,395
In Great Britain June 7, 1935

9 Claims. (Cl. 170—172)

This invention relates to blades for airscrews and the like, such as marine propellers, and is applicable particularly to the blades of airscrews for use on aircraft.

It is known that under some conditions, especially where high speed aircraft are concerned, those parts of the blades of an airscrew remote from the tips, or in the case of a very coarse pitch airscrew, the whole of the blades, are "stalled" during the early stages of a "take-off", the unstalled portions growing progressively towards the axis of rotation as the forward speed increases.

Owing to the helical form of the usual airscrew the angle of attack throughout the blade is only uniform at one forward speed. When the aircraft is stationary therefore, or in the early stages of "take-off", according to the pitch of the airscrew, a proportion of the blade, or in extreme cases the entire blade, presents so high an angle of attack that the blade is stalled.

In accordance with the present invention and with the object of preventing such "stalling", the leading edge of an airscrew blade is slotted, or so arranged that a slot may be formed, as is known in connection with an aircraft wing. Preferably the slotting does not extend to the tip of the blade.

This slot permits the flow of air through the blade from a part of the rear surface near the leading edge to a part of the front surface more remote from said leading edge and, in section, may be a straight oblique slot, a single curved slot, a compound curved slot, (e. g. an ogee) or other suitable section. The slot need not be of continuous length along the blade, but may be constituted by a plurality of short slots, the bridge pieces between which provide suitable support for that part of the blade in front of the slot.

In some cases part of the leading edge of a blade may be movable relatively to the remainder so that a slot may be formed at will. For example, the movable portion may be advanced and retracted by means of plungers in cylinders connected with a source of fluid under pressure and provided with suitable control valves. Alternatively, the movable portion may be carried by screwed rods extending in the direction of the general plane of the blade and operable, e. g. by worm gearing through the hub of the airscrew, so as to advance said movable portion.

The slot may debouch at the front surface of the blade at a distance from the leading edge which is about 10 to 20% of the chord of the blade, and the width of the slot at said front surface may be about 5 to 12% of said chord.

The influence of the slot will not be confined to the actual portion of the blade over which it extends but will influence the unslotted part of the blade in the region of both inboard and outboard ends of the slot, but to a smaller degree over these additional portions of the blade.

In some cases two or more slots, which may be of different lengths and sections, may be formed in a blade, one behind another, or the parts of a slot or slots may be arranged in echelon, or otherwise.

Various forms of the invention are depicted in the accompanying drawings whereof Figure 1 is a fragmentary front elevation of an airscrew; Figures 2, 3, and 4 are enlarged cross-sections on the line X—X of Figure 1, Figures 2, 3, and 4 illustrating typical forms which the slot may take; Figures 5 and 6 are views corresponding to Figure 1 but showing respectively modified forms of the invention; Figures 7 and 8 are similar views to Figures 1 and 2, but illustrating how an existing airscrew may be modified in accordance with this invention; Figure 9 is a fragmentary perspective view of a detail; Figures 10 and 11 are enlarged diagrammatic cross-sectional views on the line Y—Y of Fig. 12 of an airscrew blade showing two alternative means of moving the leading edge of the blade relatively to the remainder to form a slot; while Fig. 12 is a view similar to Fig. 1 showing the constructions of Figs. 10 and 11 applied to the leading edge of the blade.

As shown in Fig. 1 an airscrew blade $a$ is formed near and substantially parallel with, its leading edge $b$ and towards its root or hub with three slots $c$. These slots $c$ are directed away from the leading edge $b$ towards the front surface of the blade $a$ and may be, for example, straight and oblique as shown in Fig. 2, in the form of a simple curve, as shown in Figure 3, or a compound curved slot, as shown in Fig. 4. The bridge pieces $d$ between the slots $c$ provide suitable support for that part of the blade $a$ in front of said slots.

In the modification shown in Fig. 5 slots $c$ of different lengths are formed in the blade $a$, said slots $c$ being arranged in pairs, the slots of each pair being disposed one behind the other.

Fig. 6 shows a modification generally similar to that described with reference to Fig. 5, but in this case the slots $c$ are arranged in echelon, that is to say with the slots of the one row slightly staggered with respect to the slots of the other.

Figures 7, 8, and 9 show how the invention may be applied to an existing airscrew blade without slotting it. A slat *e* which is of appropriate cross-section may have integral with, or have attached thereto, V-shaped lugs *f* spaced apart along its length, and by which it may be secured to the blade *a*, the face of which is preferably recessed locally to receive the corresponding arms of the lugs.

As illustrated in Fig. 10 a part *g* of the leading edge *b* of the blade *a* (the length of said part *g* corresponding substantially with that of the slots *c*, Fig. 1 or the slat *e* of Figs. 7, 8, and 9), is mounted on a series of arms such as *h* which constitute the piston rods of pistons such as *j* of cylinders such as *k* connected by pipes such as *m* with means (not shown) by which fluid may be forced under pressure into, or exhausted from, the cylinders *k* to advance or retract the part *g*.

In the modification of the invention shown in Fig. 11 the part *g* is screw threaded as at *n* to cooperate with screwed arms such as *o* carried by the blade *a* and each of which has mounted thereon a worm wheel such as *p*, a worm *q*, rotated by means not shown, cooperating with the series of worm wheels *p* to rotate the arms *o* to advance or retract the part *g*.

I claim:—

1. An airscrew blade having a tip portion and a hub portion, a slot only in that part of the length of the blade remote from the tip portion and substantially in that half of the blade adjacent the hub portion, said slot extending obliquely from the rear face of the blade adjacent the leading edge of said blade, to the front face of the blade at a point remote from said leading edge whereby air flows through said slot from the rear to the front face of said blade.

2. An airscrew blade having a tip portion and a hub portion, a plurality of short slots only in that part of the length of the blade remote from the tip portion and substantially in that half of the blade adjacent the hub portion, said slots extending obliquely from the rear face of the blade, adjacent the leading edge of said blade to the front face of the blade, to a point remote from said leading edge whereby air flows through said slot from the rear to the front face of said blade.

3. An airscrew blade having a tip portion and a hub portion, an auxiliary element movable relatively to said blade mounted on the leading edge of said blade at that portion remote from the tip portion, so constructed and arranged that a slot may be formed extending obliquely from the rear face of the blade, at a part adjacent said leading edge, to the front face of the blade, at a point remote from said leading edge.

4. An airscrew blade having a tip portion and a hub portion connected by leading and trailing edges, said tip portion being imperforate, a slot in said hub portion extending obliquely from the rear face of said blade adjacent said leading edge to the front face of said blade and toward said trailing edge whereby air flows through said slot from the rear to the front face of said blade.

5. An airscrew blade as in claim 4, said slot having a width on the front face of said blade equal to from 5% to 12% of the chord of said blade.

6. An airscrew blade as in claim 4, said slot being spaced from said leading edge on the front face of said blade a distance equal to from 10% to 20% the chord of said blade.

7. An air screw blade as in claim 3, a cylinder in said blade, a plunger mounted in said cylinder and connected to said auxiliary movable element, and hydraulic means connected with said cylinder to move said plunger and said movable element.

8. An airscrew blade as in claim 3, an adjusting member connecting said movable element to said blade, said member threadedly engaging said element, a worm gear mounted on said member in said blade, and means to drive said worm gear, so constructed and arranged that said element is adjusted by said threadedly engaged member.

9. An airscrew blade having a tip portion and a hub portion, leading and trailing edges connecting said portions, said tip portion being imperforate, a slat member, means connecting said slat member to the hub portion of said leading edge, said connecting means spacing said slat from said leading edge to form a slot extending obliquely from the rear face of said blade to the front face of said blade and from the leading edge toward the trailing edge.

CHARLES RICHARD FAIREY.